United States Patent
Vandamme

(10) Patent No.: US 11,999,593 B2
(45) Date of Patent: Jun. 4, 2024

(54) CLAMP FOR COATED ELEVATOR ROPE

(71) Applicant: BEKAERT ADVANCED CORDS AALTER NV, Aalter (BE)

(72) Inventor: Dimitri Vandamme, Lauwe (BE)

(73) Assignee: BEKAERT ADVANCED CORDS AALTER NV, Aalter (BE)

(*) Notice: Subject to any disclaimer, the term of this patent is extended or adjusted under 35 U.S.C. 154(b) by 0 days.

(21) Appl. No.: 18/024,373

(22) PCT Filed: Sep. 8, 2021

(86) PCT No.: PCT/EP2021/074654
§ 371 (c)(1),
(2) Date: Mar. 2, 2023

(87) PCT Pub. No.: WO2022/053481
PCT Pub. Date: Mar. 17, 2022

(65) Prior Publication Data
US 2024/0010465 A1 Jan. 11, 2024

(30) Foreign Application Priority Data
Sep. 8, 2020 (EP) ..................................... 20194990

(51) Int. Cl.
*B66B 7/08* (2006.01)
*F16G 11/04* (2006.01)

(52) U.S. Cl.
CPC .............. *B66B 7/08* (2013.01); *F16G 11/046* (2013.01)

(58) Field of Classification Search
None
See application file for complete search history.

(56) References Cited

U.S. PATENT DOCUMENTS

| | | | | |
|---|---|---|---|---|
| 9,840,397 B2* | 12/2017 | Zapf | ....................... | B66B 7/085 |
| 2002/0042973 A1* | 4/2002 | Rivera | ................... | B66B 7/085 |
| | | | | 24/115 R |

(Continued)

FOREIGN PATENT DOCUMENTS

| | | |
|---|---|---|
| CN | 107628508 | 1/2018 |
| JP | 2001-165245 | 6/2001 |
| WO | 2006/029544 | 3/2006 |

OTHER PUBLICATIONS

International Search Report and Written Opinion of the International Searching Authority issued Nov. 22, 2021, in International (PCT) Application No. PCT/EP2021/074654.

*Primary Examiner* — David M Upchurch
(74) *Attorney, Agent, or Firm* — Wenderoth, Lind & Ponack, L.L.P.

(57) ABSTRACT

The invention relates to a clamp or termination for a coated elevator rope in an elevator. When coated elevator ropes are used electrostatic charge may build up in the ropes due to the insulating coating. These charges generate repelling or attracting forces between the parallel ropes, which hampers the correct miming of the ropes in the pulleys and in extreme cases may derail the coated elevator ropes. The wedge and socket clamps according the invention discriminate themselves from prior art wedge and socket clamps in that the piercing instruments are provided in the low tension zone of the clamp. These piercing instruments can take the form of pins, fins or other protrusions and establish an electrical connection between the wedge and the conductive tensile member. Such an elevator clamp allows to leak static electricy being build up or allows wear detection per elevator rope.

14 Claims, 2 Drawing Sheets

(56) References Cited

U.S. PATENT DOCUMENTS

Figure 1:
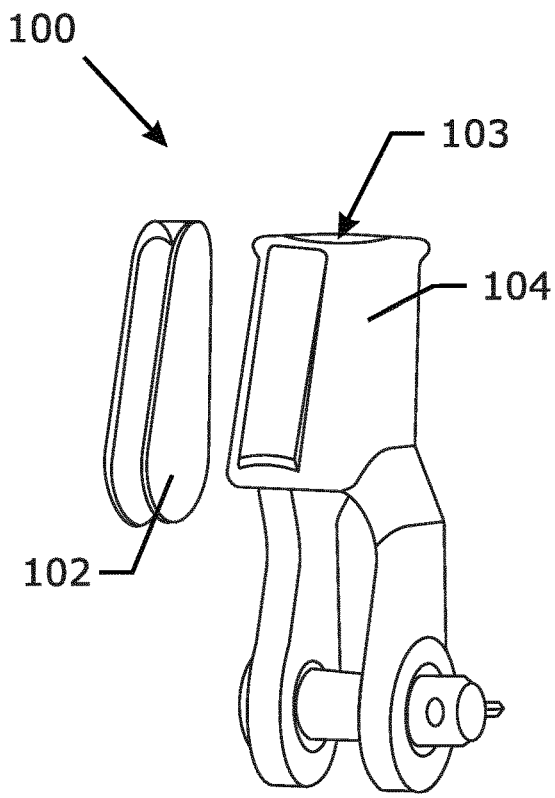

2017/0121149 A1* 5/2017 Lehtinen ............... B66B 7/1223
2018/0105391 A1* 4/2018 Dold ........................ B66B 7/08
2021/0130134 A1* 5/2021 Palazzola ................ B66B 7/085

* cited by examiner

CLAMP FOR COATED ELEVATOR ROPE

Description

Technical Field

The invention relates to a clamp for holding the end of an elevator rope. Such clamp is also known as a rope termination.

Background Art

In most elevators for the transportation of persons or goods the cabin or cage is suspended on two or more tension members that are driven by a hoisting machine. Shortly before the turn of the century, there has been a trend to reduce the size of the hoisting machine in order to eliminate the need for a machine room on top of the shaft of the elevator. To enable this the traditional steel wire rope with a diameter of 8 mm or more comprising steel wires with a diameter of more than half a millimetre and a tensile strength of less than 2000 megapascal have been replaced by several steel cords arranged into a coated elevator belt or
one steel cord in a coated elevator rope.

The steel cords contain thin, high tensile steel wires arranged into strands, on their turn arranged into cords.

The use of these thin, high tensile steel wires makes it possible to reduce the size of the tension members. E.g. steel cords with a diameter of 5 mm can now replace an 8 mm steel wire rope. As a result the drive pulley of the hoisting machine can be reduced in size and a direct drive motor without gear box can be used resulting in an overall reduction of the size and weight of the hoisting machine. The hoisting machine becomes small enough so that it can be mounted on the top or bottom of the shaft without the need for installing a machine room on top of the roof.

However, when using steel cords comprising thin, high tensile steel filaments, the filaments have to be protected from direct contact with the pulleys as they are more susceptible to transversal forces. This is normally done by jacketing the wires in an abrasion resistant polymer that is predominantly polyurethane.

While the polymer very well protects the steel filaments it is generally non-conductive to electricity. As a result, static charge can build up on the mantle of the tension member that may result in different problems:

static charge may lead to a static electricity discharge that is a risk in an elevator shaft that is generally kept dry and wherein dust collects over the years. A spark may result in the start of a dust fire;
static charge may result in the mutual repelling of the parallel arranged elevator ropes. Although this force may not be large, not a lot of force is needed to deflect long elevator ropes hanging side by side. This may even result in the derailing of the elevator ropes out of the guiding pulleys and even the drive pulley.

The problem of static charge build-up is further aggravated when polymer diverting pulleys are being used in the path of the tension member. Of course these problems do not occur with prior art steel wire ropes as no static electricity builds up on the highly conductive steel wires.

Particularly in the case of a coated elevator rope the latter problem may occur because a round elevator rope has no preferential bending direction as opposed to a belt and therefore is easier to deflect.

Different solutions may be suggested such as using an earthed, conductive brush that takes away static charge but the brushes wear quicker than desired. Also the coating can be made conductive, but this adds to the price of the coating and also affects the properties of the coating.

A known coated elevator rope clamp for a flat belt is described in WO 2006/029544 A1. It comprises a wedge and a wedge receiving compartment. The friction surface of the wedge receiving compartment that is closer to the loose end of the flat belt is provided with a surface roughness that is higher than that of the remaining surface of the wedge compartment that is closer to the carrying end of the flat belt. The latter surface is provided with a reduced surface roughness as compared to the remaining surface of the wedge compartment. The clamp is particularly designed to prevent high, point like loads on the flat belt.

The inventor proposes a solution to solve the above problems that will be described hereinafter.

DISCLOSURE OF INVENTION

It is an object of the invention to find a solution to the mentioned problems related with static charge build-up in coated elevator ropes. It is a further object of the invention to provide a coated elevator rope clamp or termination that conducts away the charge building up in the coated elevator rope. It is another object to provide an elevator with a coated elevator rope equipped with these termination clamps.

In claim 1 a clamp according a first aspect of the invention is described. The clamp or termination is for holding one of the two ends of a coated elevator rope. Such elevator rope comprises one or more tensile members surrounded by a coating. The tensile members are electrically conducting, while the coating is electrically insulating. The clamp comprises a wedge and a socket body. The wedge fits into the internal tapered hollow formed by the socket body.

Such a clamp is well known and is subject of standardisation for example EN 13411-6+A1:2008 'Terminations for steel wire ropes—Safety—Part 6: Asymmetric wedge socket'. The socket is called 'asymmetric' because the attachment point of the clamp is directly in line with the longitudinal axis of the most tensioned portion of the elevator rope. With the 'most tensioned portion' of the elevator rope is meant the piece of elevator rope that is held between the wedge and the internal tapered hollow that is closest to the load tensioning the elevator rope. The part of the wedge that is in contact with the most tensioned portion of the elevator rope is called the 'clamping track' of the wedge. The side of the internal tapered hollow against which the most tensioned portion of the elevator rope is held will be called the 'aligned side' as this side must be aligned with the attachment point of the clamp.

Outside the most tensioned portion the elevator rope turns over the rounded end at the wide side of the wedge and is back inserted in between the wedge and the internal tapered hollow. The tail-end protrudes from the clamp at the side of the socket body opposite to where the elevator rope enters. The track on the wedge from the end of the clamping track all the way to where the elevator rope is no longer held by the socket body will be called the 'holding track'. The part of the internal tapered hollow that holds the rope against the holding track of the wedge will be called the 'inclined side' of the internal tapered hollow as it is inclined relative to the aligned side because of shape of the wedge.

The mechanical holding principle of the clamp is simple in that due to the tensioning of the elevator rope, the wedge pulls into the internal tapered hollow and thereby firmly holds the elevator rope between the wedge and the socket body at least in the 'clamping length'. Once outside the clamping length, the forces along the centreline of the elevator rope decrease to zero, there where the elevator rope exits the holding length. The lateral forces exerted on the rope between the wedge and the internal tapered hollow of the socket body are about equal in the holding track-inclined side and the clamping length-aligned side.

According a first aspect of the invention, the inventive clamp is characterised in that the wedge is provided with one or more piercing instruments on the holding track of the wedge.

According a second aspect of the invention, the inventive clamp is characterized in that the inclined side of the internal tapered hollow is provided with piercing instruments.

The function of those 'piercing instruments' is to pierce, to penetrate through the coating of the coated elevator rope. The piercing instruments are electrically conductive and establish an electrical contact between the wedge and the conductive tensile member of the coated elevator rope. Therefore the piercing instruments must be sufficiently sharp and penetrate sufficiently deep through the insulating coating in order to reach the internal, conductive tensile member of the coated elevator rope.

The presence of those 'piercing instruments' is counter-intuitive in that the standards require that the rope groove in the wedge and the socket body should be free of marks and joints, while the invention—by the presence of the piercing instruments—requires just the opposite. For prior art, bare steel elevator ropes the absence of any sharp marks or joints in the path of the steel rope is a needed requirement for fear of pinching of the steel wires.

The inventor has a different opinion in that for coated elevator ropes, the steel wires are already cushioned by the polymer coating, and the risk for extreme local pressure on the steel wires is low. Moreover, the inventor opinions that the piercing instruments adds additional retention power to the clamp.

In an embodiment of the invention according the first aspect, the wedge is provided with a contact member for electrically contacting the wedge with the socket body. While in most case the wedge may touch the socket body and thereby establishes an electrical contact between wedge and socket, this is not always guaranteed, the more that the coated elevator rope prevents electrical contact between socket body and wedge. In order to guarantee this electrical contact, the contact member is helpful.

The contact member may take the form of a simple electrical connection wire between the socket body and the wedge, for example a braided copper wire that is attached to the socket body and the wedge. In this manner wedge and socket body are also held together in pair.

The contact member may advantageously be in the form of an electrically conductive spring, such as a blade spring or a washer spring. Such spring is preferably made of metal or metal alloys that conduct electricity well, such as copper, brass, bronze, copper-beryllium, or similar materials.

As the wedge has an axis of symmetry along its longest length, one has to be careful to correctly insert the wedge into the socket body. When the piercing instruments would be oriented towards the aligned side of the socket body, this could lead to a combination of high tensile stresses and high transversal stresses during loading. The combination of both could lead to fatal fracture, certainly when combined with a repetitive load pattern. In order to prevent this problem a key is provided on the wedge, that inserts in a slot of the socket body preventing incorrect insertion of the wedge. Advantageously, the key can be combined in the contact member.

In both the first and second aspect of the invention, the piercing instruments can be pins, fins or other protrusions. A pin is a generally round protrusion ending in a point. Fins are flat and long, having a knife or ridge shape. Typically they are oriented parallel to the coated elevator rope axis. Also protrusions, projections, bulges can fulfil the function of a piercing instrument. They can for example end in a blunt semi-spherical top. Indeed, as the lateral pressure between the internal tapered hollow and the wedge is high when the coated elevator rope is tensioned in the clamp, those blunt protrusions will also be able to penetrate the coating provided they are sufficiently high.

To this end the height of the pins, fins or other protrusions is larger than the thickness of the coating of the elevator rope. In one embodiment this height is only marginally larger for example up to 20% larger than the thickness of the coating. In another embodiment, the pins, fins or protrusions can penetrate up to the middle of the conductive tensile members. For example a simple screw may be introduced in the holding track of the wedge.

The materials from which the socket body and the wedge are made are not particularly different from those of the known clamps. For example for the wedge malleable cast iron is recommended. As the socket body has to withstand extreme forces due to the push of the wedge, they are made of spheroidal graphite cast iron. Both materials are good electrical conductors. Also the piercing instruments are preferably made of metal or a metal alloy as their function is to provide conduction. The metal pin, fin or protrusion must be sufficiently strong in order to be able to pierce the coating. The same metal as of which the wedge is made can be used (malleable iron), or a brass or bronze pin, fin or protrusion can be fixed in the holding path of the wedge.

In the second aspect of the invention it is less advisable to compromise the integrity of the socket body by drilling holes or making cuts in it. As this socket body is made of spheroidal graphite cast iron, any irregularities in the body where stress may build up may lead to catastrophic failure. It is therefore advised that in the second aspect of the invention, the piercing instruments are part of, are integral to the cast socket body. Fins, pins or other protrusions can easily be provided in the cast mold of the socket body. For example: a fin on the inclined side of the symmetry plane of the socket body can easily be provided and also still allows for easy removal in case the cast mold is made of two mirrored halves.

In order to prevent galvanic corrosion of the tensile members—that are preferably made of steel filaments—the piercing instruments are best made of a metal or metal alloy that has an equal or lower electrochemical potential than that of the conductive tensile members. For example the use of a copper piercing instrument contacting a steel cord as a tensile member may result in premature corrosion of the steel filaments, which is less desirable. If the steel filaments of the tension member are zinc coated steel filaments it may be advisable to coat the piercing instruments with e.g. zinc or to make them from a zinc containing pin.

In a further preferred embodiment of the invention the wedge and socket are shaped to receive, to mate, to fit to the cross sectional shape of the tension member. The following shapes come to mind:

The tension member has a round cross section as in the case of a round coated elevator rope with one single steel cord in the center. The wedge surface and the aligned and/or inclined side of the tapered hollow are provided with a semicircular U groove;

The tension member has a rectangular section with a thickness that is smaller than the width. The wedge and surface of the tapered hollow is flat and possibly provided with a serration to increase the grip. The serration is not sufficient to pierce the polymer coating;

The tension member is made up of a number of parallel, round steel cords, encased in a polymer coating, wherein the cross section shows in-line (in a plane) round sections that are connected to another over their length. A figure 'ooooo' for example;

According a third aspect of the invention an elevator is claimed. The elevator is conventional that it comprises a cabin or cage that is held, supported, hung from one or more elevator ropes. The elevator ropes comprise one or more electrically conductive tensile members surrounded by an insulating coating. At least one end of all said elevator ropes is held with a clamp according to the first and/or second aspect of the invention. The at least one clamp electrically connects to the electrically conductive tensile members. If there are for example three elevator ropes, there will be six ends. If one of those ends is held with the described clamp, the requirement is met.

In a further preferred embodiment, at least one end of each of said elevator ropes are held with a clamp according the first or second aspect of the invention. As in the example of three elevator ropes this means that three, four five or six ends are held in the clamp.

Preferably, all the ends of the elevator ropes at the same side are provided with one clamp according the first or second aspect of the invention. For example all three ends of the elevator ropes that connect to the cabin are provided with the inventive clamp, or all three ends connecting to the counterweight (1:1 roping) or the fixed point of the elevator (2:1 roping) are provided with the inventive clamp.

If the clamps are electrically interconnected to one another, e.g. by being held in the same metal block, all conductive tensile members are at the same electrical potential. Advantageously, all clamps can connect to ground by grounding the metal block thereby establishing a drain for static electricity.

The inventive clamps allows for monitoring the condition of the rope. If for example both ends of a single elevator rope are provided with the inventive clamps, monitoring of induction, capacitance or resistance over the conductive tensile member of that single elevator rope can be envisaged.

Alternatively, when only one end of a single elevator rope is connected to electrical ground the condition of the coating can be monitored by e.g. capacitance measurement. Or the wire fractures can be detected by a mass contact (for example a copper tube through which the coated elevator rope runs) provided that wire fracture has pierced the coating.

BRIEF DESCRIPTION OF FIGURES IN THE DRAWINGS

Figure 2:
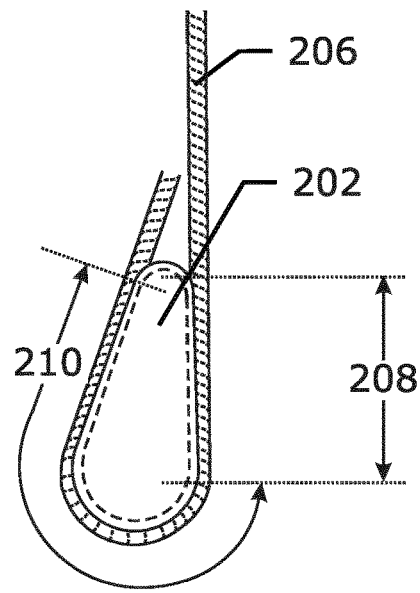
Figure 3:
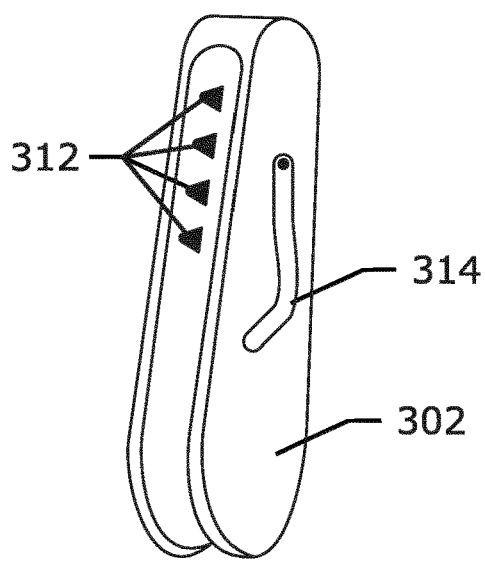
Figure 4:
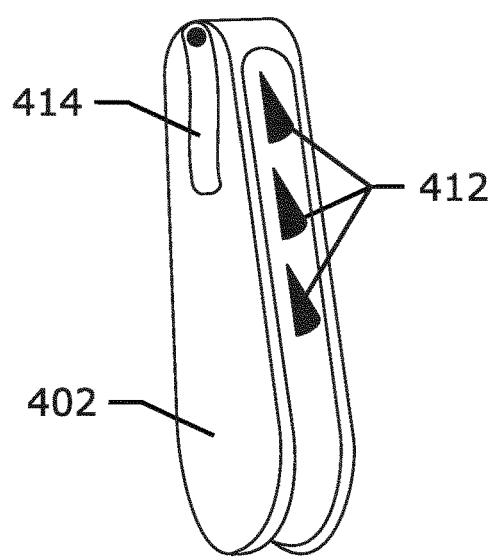
Figure 5:
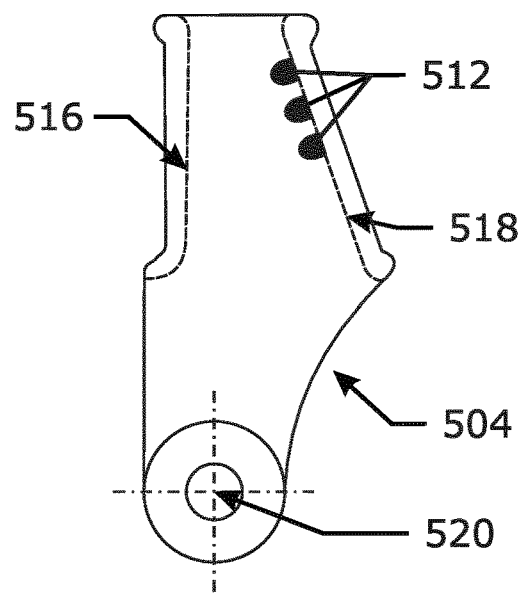
Figure 6:
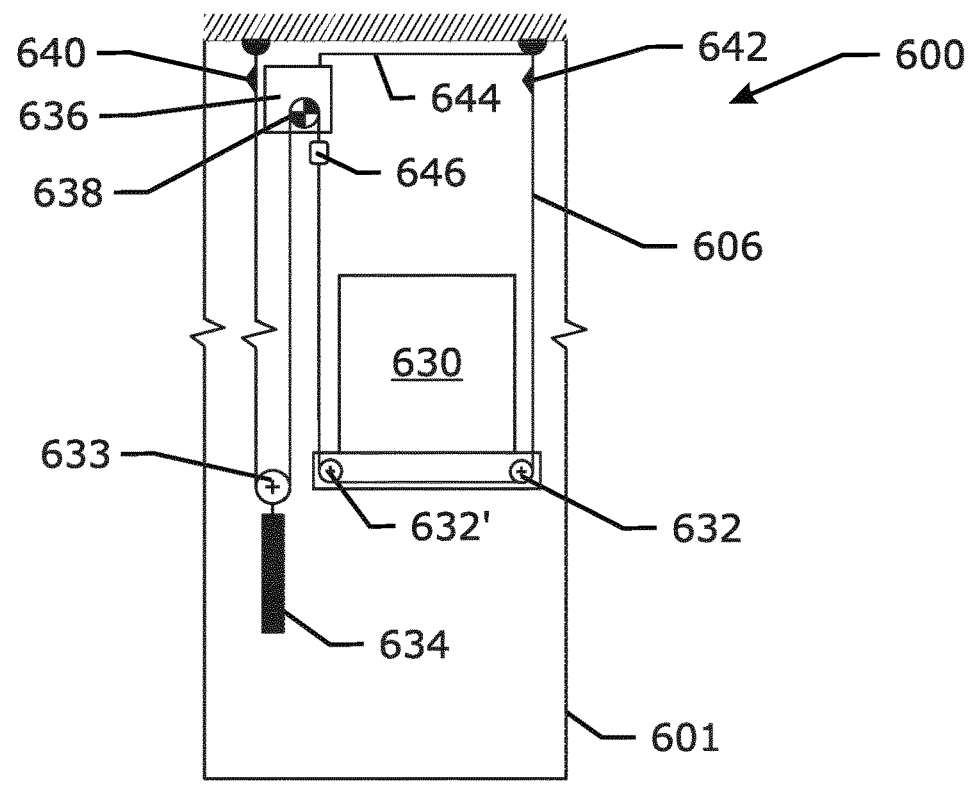

FIG. 1 shows an end termination as known in the art;
FIG. 2 clarifies the different tracks on the wedge;
FIG. 3 shows a first embodiment of the first aspect of the invention;
FIG. 4 shows a second embodiment according the first aspect of the invention;
FIG. 5 shows an embodiment of the second aspect of the invention;
FIG. 6 shows an embodiment according the third aspect of the invention;

Similar items across different figures carry the same unit and tens number,
while the hundreds digit refers to the number of the figure.

MODE(S) FOR CARRYING OUT THE INVENTION

FIG. 1 shows an elevator rope termination or clamp 100 as known in the art. Basically, the clamp comprises a socket body 104, in which a wedge 102 fits into the internal tapered hollow 103. Around the wedge the coated elevator rope is looped, before being fitted into the internal tapered hollow. By tensioning the elevator rope the wedge is drawn into the clamp thereby holding the elevator rope.

FIG. 2 shows the wedge 202 with the coated elevator rope 206 looped around it. The clamping track 208 is the length along the side of the wedge that holds, pushes the elevator rope against the aligned side 516 of the internal tapered hollow. The holding track 210 starts as soon as the elevator rope exits the first time the tapered internal hollow and ends when the elevator rope exits the internal tapered hollow for the second time.

FIG. 3 shows an embodiment of the invention according the first aspect of the invention. The wedge is provided with four piercing instruments 312 present in the holding track of the wedge. In this embodiment the piercing instruments 312 have the form of pins. The pins have a height that is larger than the thickness of the coating. In this manner, electrical contact is ensured between the tensile member and the wedge 302 as the pins 312 penetrate through the coating down to the tensile members.

In order to ensure that the wedge 302 also electrically connects to the socket body 104, the wedge 302 is provided with a contact member 314 that in this case is a conductive blade spring that is fixed to the wedge 302 for example with a screw or weld. Upon insertion of the wedge 302 in the internal hollow 103 of the socket body 104, the blade spring pushes against the inside of the internal hollow and thereby ensures electrical contact between the wedge and the socket body. The socket body is further mechanically held and connects electrically to further wiring (not shown).

FIG. 4 shows an alternative embodiment of the first aspect of the invention wherein the wedge 402 is now provided with three sharp fins 412 in the holding track. The height of the sharp fins is about the half of the diameter of the elevator rope and penetrates deeper into the elevator rope. An electrical contact member 414 that in this case also acts as a key for insertion in the internal hollow of the socket body is also made in the form of a spring. The key slides into a recess of the internal hollow (not shown) and thereby prevents that the wedge would be inserted in the socket body with the fins 412 arriving in the clamping track instead of the holding track.

FIG. 5 shows the socket body 504 according an embodiment of the second aspect of the invention. In this embodiment the socket body 504 is provided with a series of protrusions 512 that are situated in the inclined side of the internal tapered hollow 518. The aligned side of the internal tapered hollow is indicated with 516 and is in line with the centre of the suspension bore 520. The series of protrusions 512 are in this case blunt, hemispherical ridges perpendicular to the direction of the coated elevator rope that are formed in the cast mold for casting the socket body.

FIG. 6 shows an embodiment according the third aspect of the invention. An elevator 600 with a cabin 630 is shown. The cabin 630 runs on tracks (not shown) in elevator shaft 601 and is carried by coated elevator ropes 606 that run over diverting pulleys 632, 632' under the cabin 630 that are made of non-conducting polymers. The cabin 630 is balanced by the counterweight 634 with diverting pulley 633 according to a 2:1 roping. The drive and control engine 636 is mounted inside the elevator shaft 601 and has a series of parallel drive pulleys 638 for driving the coated elevator ropes. The elevator ropes are held by prior art, insulating clamps 640 at the side lifting the counterweight 634 and inventive clamps 642 to the fixed point at the top of the shaft.

The inventive clamps 642 are connected through electrical control wires 644 that connect to drive and control engine 636. A detector 646 is mounted close to the drive and control engine 636. The detector 646 can for example be a conductive tube where through one elevator rope runs. When now a broken filament of the tensile member would pierce the coating of the coated elevator rope, a short circuit will occur between the inventive clamps 642 and the detection circuit of the drive and control unit 636. The event can be monitored and logged for timely replacement of the coated elevator rope.

By connecting the inventive clamp to earth any static charge building up on the coated elevator ropes is led to earth and the attraction or repelling of the coated elevator ropes is prevented.

The invention claimed is:

1. A clamp for holding an end of a coated elevator rope, the elevator rope comprising one or more tensile members surrounded by a coating, said clamp comprising a wedge and a socket body having an internal tapered hollow, said wedge being receivable in said internal tapered hollow of said socket body, said wedge having a clamping track and a holding track,
   wherein
   said wedge is provided with one or more piercing instruments on the holding track of said wedge, said piercing instruments for piercing the coating of said elevator rope, said piercing instruments being electrically conductive.

2. The clamp according to claim 1 wherein said wedge is provided with a contact member for electrically contacting said wedge with said socket body.

3. The clamp according to claim 2 wherein said contact member is an electrically conductive spring.

4. The clamp according to claim 1 wherein the wedge is provided with a key for insertion into said internal tapered hollow.

5. A clamp for holding an end of a coated elevator rope, the elevator rope comprising one or more tensile members surrounded by a coating, said clamp comprising a wedge and a socket body having an internal tapered hollow, said wedge being receivable in said internal tapered hollow of said socket body, said internal tapered hollow having an aligned side and an inclined side,
   wherein
   said inclined side of said internal tapered hollow is provided with piercing instruments, said piercing instruments for piercing the coating of said elevator rope, said piercing instruments being electrically conductive.

6. The clamp according to claim 1 wherein said piercing instruments are pins, fins or protrusions that have a height that is larger than the thickness of the coating of the elevator rope.

7. The clamp according to claim 1 wherein the material of said piercing instruments is a metal or metal alloy that has an equal or lower electrochemical potential relative to the conductive tensile member.

8. The clamp according to claim 1 wherein said wedge and socket are shaped to receive a tension member with a round cross section.

9. The clamp according to claim 1 wherein said wedge and socket are shaped to receive a tension member with a rectangular cross section.

10. The clamp according to claim 1 wherein said wedge and socket are shaped to receive a tension member with a cross section comprising in-line round sections that are lengthwise connected to one another.

11. An elevator comprising a cabin supported by one or more elevator ropes, wherein said elevator ropes comprise one or more electrically conductive tensile members surrounded by an insulating coating
    wherein
    at least one end of said elevator ropes is held with a clamp according to claim 1.

12. The elevator according to claim 11 wherein at least one end of each of said elevator ropes are held with the clamp.

13. The elevator according to claim 11 wherein all electrically conductive tensile members are electrically connected to one another through said clamps.

14. The elevator according to claim 13 wherein all electrically conductive tensile members connect to ground at the same end side of said elevator ropes.

\* \* \* \* \*